United States Patent
Williams

(10) Patent No.: US 7,152,640 B1
(45) Date of Patent: Dec. 26, 2006

(54) TREE CUTTING ATTACHMENT FOR A SKID STEERLOADER

(76) Inventor: Larry L. Williams, Route 3, Box 256A, Weatherford, OK (US) 73096

( * ) Notice: Subject to any disclaimer, the term of this patent is extended or adjusted under 35 U.S.C. 154(b) by 0 days.

(21) Appl. No.: 10/896,686

(22) Filed: Jul. 22, 2004

Related U.S. Application Data

(60) Provisional application No. 60/511,513, filed on Oct. 15, 2003.

(51) Int. Cl.
*A01G 23/08* (2006.01)

(52) U.S. Cl. ...................... 144/4.1; 144/34.1

(58) Field of Classification Search ........ 144/334–336, 144/4.1, 34.1, 24.12; 56/14.7, 15.6, 256, 56/8; 37/302
See application file for complete search history.

(56) References Cited

U.S. PATENT DOCUMENTS

| | | | |
|---|---|---|---|
| 4,506,464 A | 3/1985 | Cartner | |
| 4,592,398 A * | 6/1986 | Golob et al. ................. | 144/4.1 |
| 4,802,327 A * | 2/1989 | Roberts ...................... | 56/15.2 |
| 4,946,488 A | 8/1990 | Davison | |
| 4,998,573 A * | 3/1991 | York ......................... | 144/34.1 |
| 4,998,590 A | 3/1991 | Wells | |
| 5,101,873 A * | 4/1992 | Marshall .................... | 144/34.5 |
| 5,378,852 A | 1/1995 | Manor | |
| 5,396,754 A | 3/1995 | Fraley | |
| 5,475,970 A * | 12/1995 | Landry, Jr. .................. | 56/8 |
| 5,537,808 A | 7/1996 | Dallman | |
| 5,562,397 A | 10/1996 | Albright | |
| 5,692,855 A | 12/1997 | Burton | |
| 5,738,155 A | 4/1998 | Cochram | |
| 5,775,075 A | 7/1998 | Dannar | |
| 5,875,573 A | 3/1999 | Hayden | |
| 5,950,699 A | 9/1999 | Dove | |
| 5,967,738 A | 10/1999 | Warthold | |
| 6,085,505 A | 7/2000 | Edwards | |
| 6,138,444 A | 10/2000 | Torras, Sr. | |
| 6,390,765 B1 | 5/2002 | Dick | |
| 6,431,231 B1 | 8/2002 | Braaten et al. | |
| 6,453,957 B1 * | 9/2002 | Devaney .................... | 144/34.1 |
| 6,662,835 B1 * | 12/2003 | Gengler ..................... | 144/34.1 |

FOREIGN PATENT DOCUMENTS

WO    PCT/AU00/00171    9/2000

* cited by examiner

*Primary Examiner*—Shelley Self
(74) *Attorney, Agent, or Firm*—Mary M. Lee

(57) ABSTRACT

A tree cutting attachment for a skid steer loader. The attachment comprises a universal mounting plate by which the attachment quickly and simply is removably attachable to the loader. A circular saw blade is supported at the end of a non jointed arm that extends forwardly from the mounting plate. A hydraulically driven, direct drive motor is supported on the forward end of the arm above the blade and an overhung load adapter may be interposed between the motor and the blade. The blade is mounted for rotation on a vertical axis and preferably is a circular blade with a toothed edge. Leaving the cutting edge of the blade exposed about its entire periphery allows the blade to approach and cut upstanding trees from three sides. A brush guard, preferably of expanded metal, extends upwardly from the arm high enough to protect the operator of the loader.

32 Claims, 6 Drawing Sheets

TREE CUTTING ATTACHMENT FOR A SKID STEERLOADER

CROSS-REFERENCE TO RELATED APPLICATIONS

This application claims the benefit of the filing date of provisional application Ser. No. 60/511,513, entitled "Hydraulic Tree Cutting Saw Attachment for Skid Steer Loader," filed Oct. 15, 2003, the contents of which are incorporated herein by reference.

FIELD OF THE INVENTION

The present invention relates to devices for cutting trees, more particularly but without limitation, to tree cutting attachments for skid steer loaders.

BACKGROUND OF THE INVENTION

The red cedar tree (*Juniperus Virginana*) is a natural constituent of the landscape across Oklahoma and the Great Plains. Historically, growth of red cedar trees was naturally controlled by fires and competing wild grasses. However, increasingly effective fire suppression techniques have led to a dangerous overgrowth of these trees. Much valuable ranch land has been overrun and in some cases rendered useless. Experts warn that, unless it is curtailed, the incursion of red cedar trees will do long-lasting damage to the forestry and rangeland ecosystems with hazardous effects on wildlife and land productivity. Among the problems associated with red cedar overgrowth are increased pollen and related allergies, decreased soil moisture (mature red cedars consume about 32 gallons per day), and increased wildfire danger.

Various methods have been employed for removing cedars, including cutting them down, controlled burns, combining goats with grazing cattle, and herbicides. Controlled burns are effective but bring the risk of an uncontrolled fire and cannot be used near populated areas. Herbicides are effective for smaller trees only.

The present invention is directed to an improvement in devices for cutting down trees. This invention can be used near houses or other structures without risk of fire or chemical contamination of other vegetation or wildlife. The cutting device of this invention can be used for small and large trees, and cuts the trees at ground level preventing regrowth. This cutting tool is attachable to virtually any skid steer loader so it is widely accessible to small farmers and ranchers to clear their own land economically using a machine with which most already are familiar.

SUMMARY OF THE INVENTION

The present invention comprises a tree cutting attachment for a skid loader. The attachment comprises a universal mounting plate removably attachable to the skid loader. A non-jointed arm extends forwardly of the mounting plate and has first and second ends. The first end is non-movably attached to the mounting plate. A cutting assembly is non-movably attached to the second end of the arm and comprises a saw blade mounted for rotation on a vertical axis. The tree cutting attachment further comprises a drive assembly for driving rotation of the saw blade.

The present invention further comprises a tree cutting assembly comprising the above-described tree cutting attachment combined with a skid steer loader.

DETAILED DESCRIPTION OF THE PREFERRED EMBODIMENT

Figure 1:
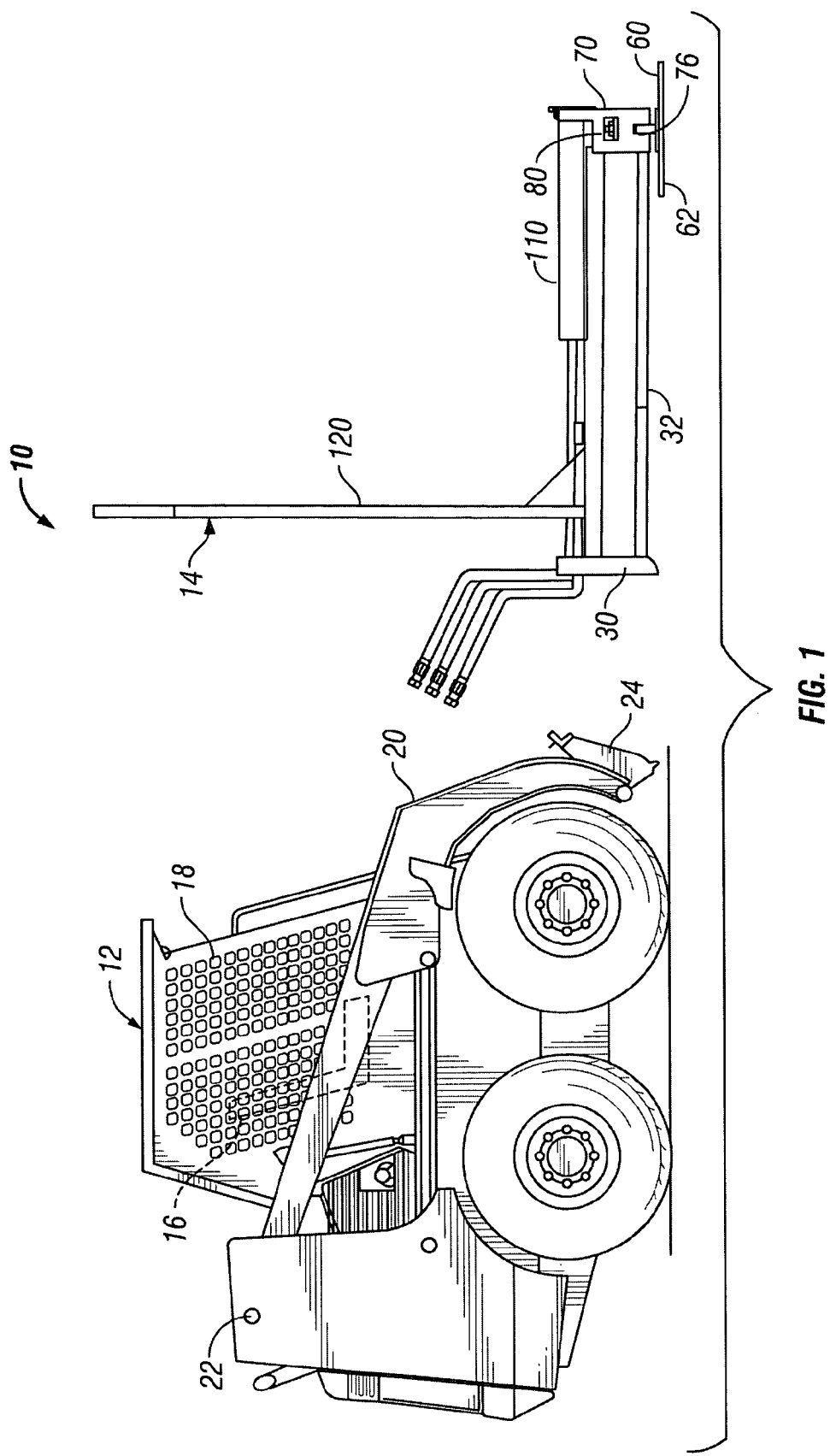
FIG. 1 is a side elevational view of a tree cutting assembly in accordance with the present invention comprising a typical skid steer loader and a tree cutting attachment about to be assembled.

Turning now to the drawings in general and to FIG. 1 in particular, there is shown therein a tree cutting assembly constructed in accordance with the present invention and designated generally by the reference numeral 10. Generally, the assembly 10 comprises a skid steer loader 12 and a tree cutting attachment 14.

The skid steer loader 12 shown in FIG. 1 is for illustration purposes only. The loader used with this invention may be any brand and may be of different sizes and types. As used herein, "skid steer loaders" refers generally to compact, highly maneuverable vehicles, also called "skid loaders" and "compact loaders," adapted to operate various attachments. These machines are maneuvered by an operator seated on a seat 16 within a compartment 18 by operating controls, such as joysticks, or a pair of steering levers or pedals (not shown), typically positioned to the left and right sides of the operator. Although controls differ among machines, in the loader illustrated the left control operates the rotation of the wheels on the left side of the vehicle, and the right control operates the rotation of the wheels on the right side of the vehicle.

The extent to which each control is pushed in the forward direction controls the forward speed at which the wheels on that side of the vehicle rotate. Similarly, the extent to which the control is pulled in a reverse direction controls the speed at which the wheels on that side of the vehicle are rotated in a reverse direction. When a control is in the centered neutral position, the wheels on the associated side do not rotate. The controls typically are biased to the neutral position.

The loader 12 typically has a pair of lift arms 20 pivotally mounted at the back of the machine at 22. The lift arms 20 usually are powered by hydraulic cylinders driven by a hydraulic system housed on the machine and controlled by levers or pedals (not seen in the drawings) also in the operator compartment 18.

The skid steer loader 12 preferably is equipped with an attachment plate or mount 24 on the front end of the lift arms 20 for supporting various removable attachments. The attachment plate 24 usually is pivotally connected to the lift arms so that at least one hydraulic cylinder, operable by another control in the operator compartment 18, can cause the plate to tilt forward and rearward. Most skid steer loaders include an auxiliary hydraulic system that can be connected to attachments that require hydraulic power.

Figure 2:
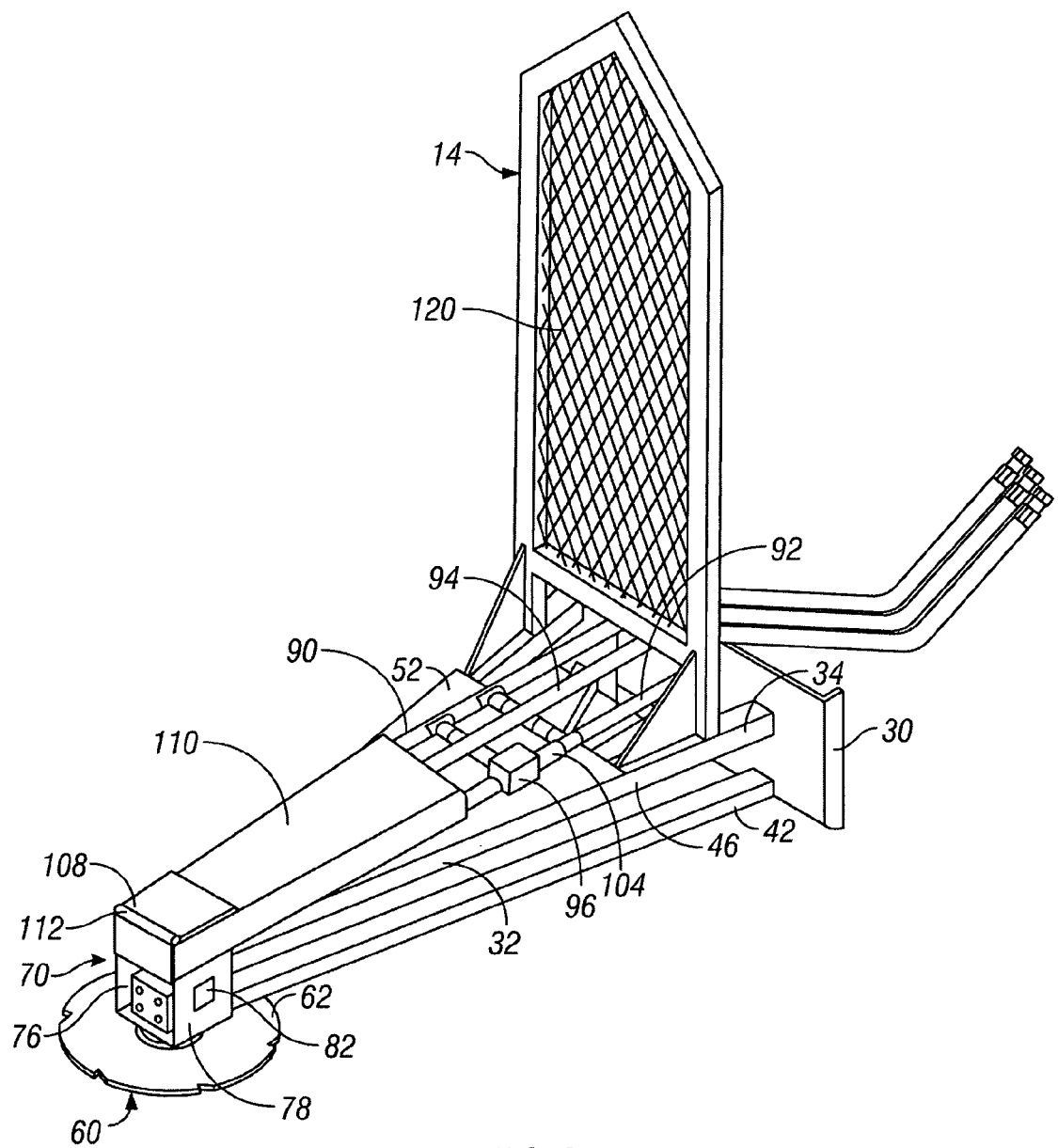
FIG. 2 is frontal perspective view of the tree cutting attachment shown in FIG. 1.

The tree cutting attachment 14, seen from the side in FIG. 1 and seen also in FIG. 2, comprises a mounting plate 30 that is removably attachable to the attachment plate 24 of the skid loader 12. The mounting plate 30 preferably is one of several commercially available universal mounting plates for skid steer loaders. The plate 30 is configured to permit easy attachment to the various brands and sizes of skid loaders. The construction and use of such universal mounting plates are well known and will not be described in detail herein.

Attached to the mounting plate 30 and extending forwardly therefrom is a support arm 32. Preferably, the support arm 32 is non-movably attached to the plate 30 at a first end 34. That is, though the arm 32 may be removable from the plate 30, once attached to the plate, the arm's position relative to the plate remains rigid. In the preferred design of the attachment, the arm 32 is non-jointed; this simplifies construction and operation and makes the arm stronger and more durable.

Figure 4:
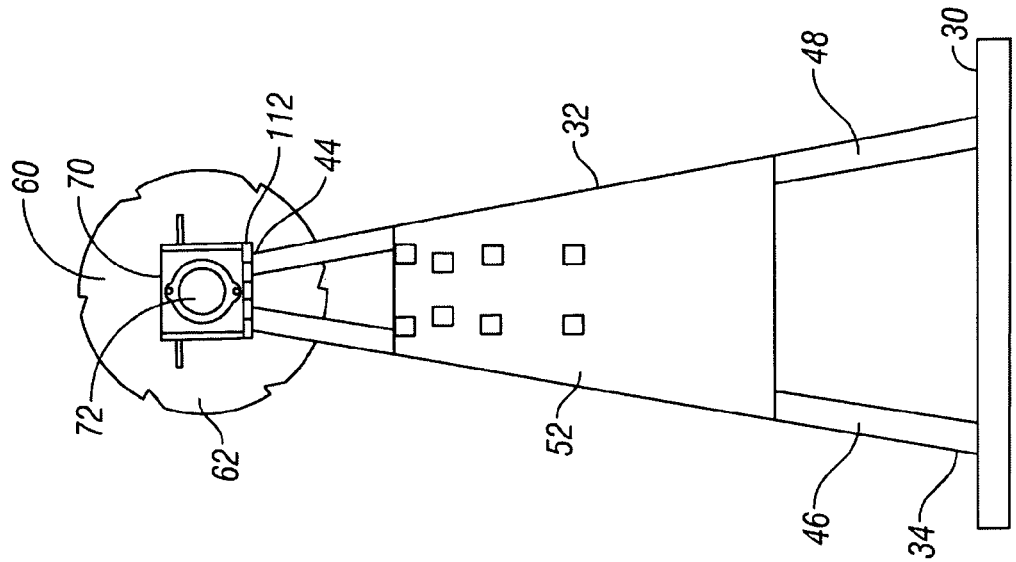
FIG. 4 is a plan view of the tree cutting attachment with the hydraulic hoses and hose cover removed to show the support arm.
Figure 3:
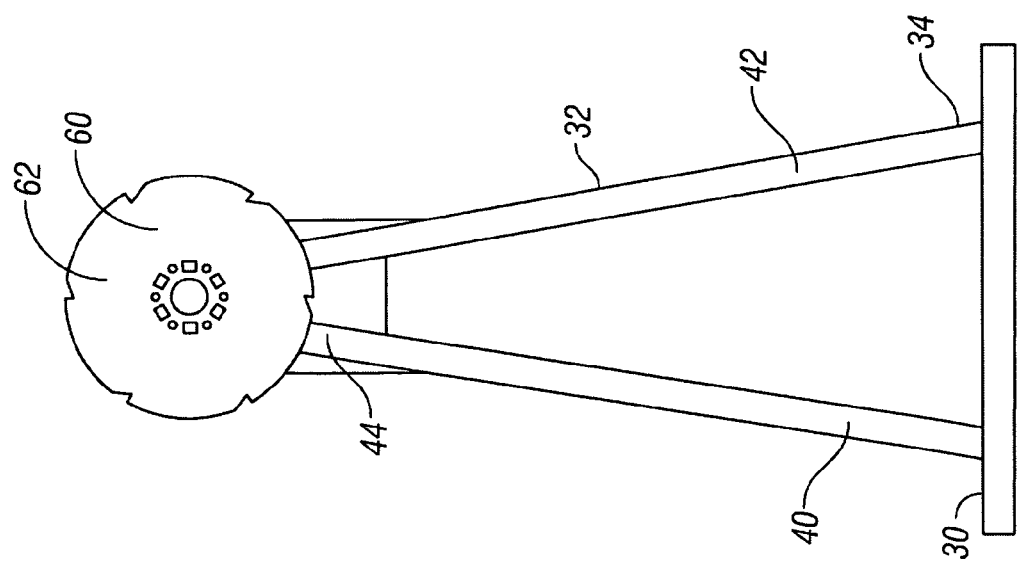
FIG. 3 is a bottom view of the support arm of the tree cutting attachment.

One exemplary design for the support arm is shown in FIGS. 3 and 4, to which attention now is directed. In this preferred design, the arm 32 comprises a pair of lower longitudinal bars 40 and 42 extending from the mounting plate 30 to the second end 44 of the arm 32. A pair of upper longitudinal bars 46 and 48 extends between the first and second ends 34 and 44 of the arm 32. To stabilize the upper bars 46 and 48, a cross plate 52 may be welded between them.

Figure 5:
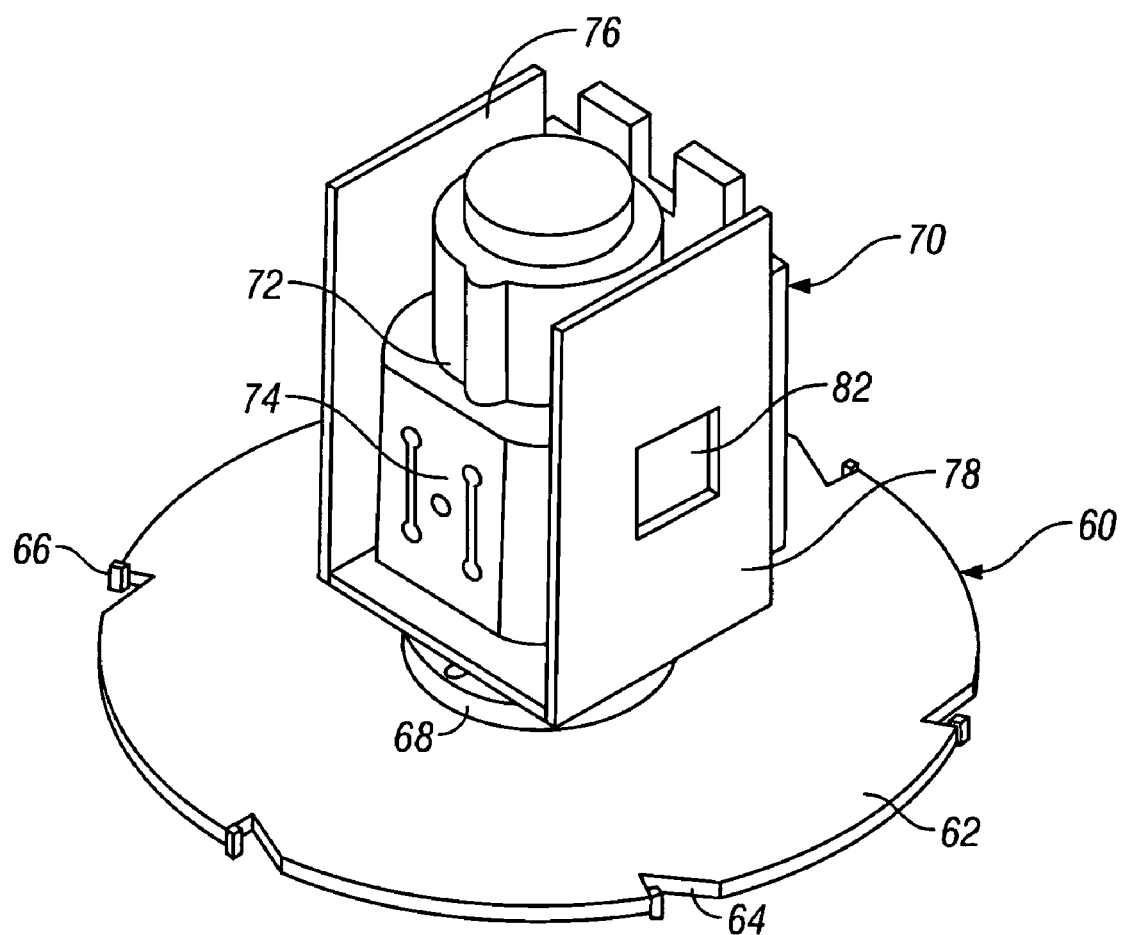
FIG. 5 is a perspective view of the drive and cutting assemblies of the tree cutting attachment shown in FIG. 2, showing the direct drive motor atop the overhung load adapter supporting a saw blade.

Referring still to FIGS. 1–4, and now also to FIG. 5, the tree cutting attachment 14 further comprises a cutting assembly 60 nonmovably attached to the second end 44 of the arm 32. That is, though the cutting assembly may be removably connected to the second end 44 of the arm 32, once attached, the cutting assembly is not movable as in rotatable or tiltable relative to the arm.

The cutting assembly 60 includes a saw blade 62 mounted for rotation on a vertical axis. That is, the blade 62 is positioned generally horizontally or parallel to the ground, as seen best in FIGS. 1 and 2. Most preferably, the blade 62 is circular and even more preferably, the blade has a toothed edge 64. Carbide tips 66 (FIG. 5) may be attached at the teeth to increase the life of the blade. As seen in FIG. 5, a hub 68 may be attached to the blade 62 by bolts (not shown) spaced circumferentially around the hole for the output shaft (also not shown). Preferably, the hub 68 has threaded bores to receive the bolts so that no nuts are needed. It is advantageous to affix bolt protectors, such as steel blocks on the underside of the blade to protect the bolt heads from abrasive contact with the ground.

The thickness and diameter of the blade 62 may vary widely. Preferably, the diameter of the blade is between about 20 inches to about 28 inches. More preferably, the diameter of the blade is about 24 inches. The preferred thickness of the blade is between about ¼ inch and about ⅜ inch. More preferably, the thickness of the blade is about ⅜ inch to about 5/16 inch.

With continuing reference to FIGS. 1–5, the tree cutting attachment 14 further comprises a drive assembly 70 for driving rotation of the saw blade 62. The drive assembly 70 comprises a motor 72. The motor may be any suitable type and should be selected to provide adequate rotational speed and torque for the blade given the hydraulic system on the loader 12. Preferably, the motor is a direct drive motor housed on the second end 44 of the support arm 32. Most preferably, the motor is a hydraulic motor that can be powered by the auxiliary hydraulic system on the loader 12. One suitable motor is a Model M44MF axial piston fixed motor marketed by Sauer-Danfoss Company (Lincolnshire, Ill.).

The diameter of the output shaft on the preferred Sauer-Danfoss hydraulic motor is ⅞ inch. To improve the strength of the drive, the motor may be augmented with an adaptor to increase the diameter of the drive shaft. An overhung load adapter 74, shown in FIG. 5, may be employed for this purpose. One suitable overhung load adapter is offered by Zero-Max, Inc. (Plymouth, Minn.), namely, the Zero-Max Model OHLA 615-14.

The motor 72 and adaptor 74 preferably are partially enclosed by side panels 76 and 78. The side panels 76 and 78 may have openings 80 and 82 for accessing and servicing the motor and the adapter.

Referring still to FIG. 2 and also now to FIG. 6, the hydraulic connections in the preferred embodiment will be described. The motor 72 is connected to three hydraulic flow lines in a well known manner which need not be described in detail. The high pressure fluid from the loaders' auxiliary system is connected by the supply line 90 to the inlet of the motor 72. De-energized fluid (charge pressure) returns to the loader in the return line 92. A case flow line 94 may be used to provide loop flushing and filtration capacity.

Preferably, a high pressure relief valve 96 is provided in the return line 92 at the point of a first crossover connection 98. A first check valve 100 may be provided in a crossover connection 102 between the supply and return lines 90 and 92. A second check valve 104 may be included in the return line 92 down stream of the relief valve 96.

Now it will be seen that the hydraulic hoses 90, 92 and 94 extend the length of the support arm 32. Thus, in most instances, it will be advantageous to at least partially enclose the lines 90, 92 and 94 to prevent damage from flying debris during use of the tree cutting attachment 14. To that end, the attachment preferably further includes a hose cover.

This hose cover may take various shapes. For example, the hose cover may take the shape of a semi-cylindrical cover for each line. Such covers may be made by splitting suitably sized pipes longitudinally and welding the covers to the support arm. The hose cover may be formed of several different materials. It may be expanded metal or formed of solid material, as in the previously described pipes.

Figure 6:
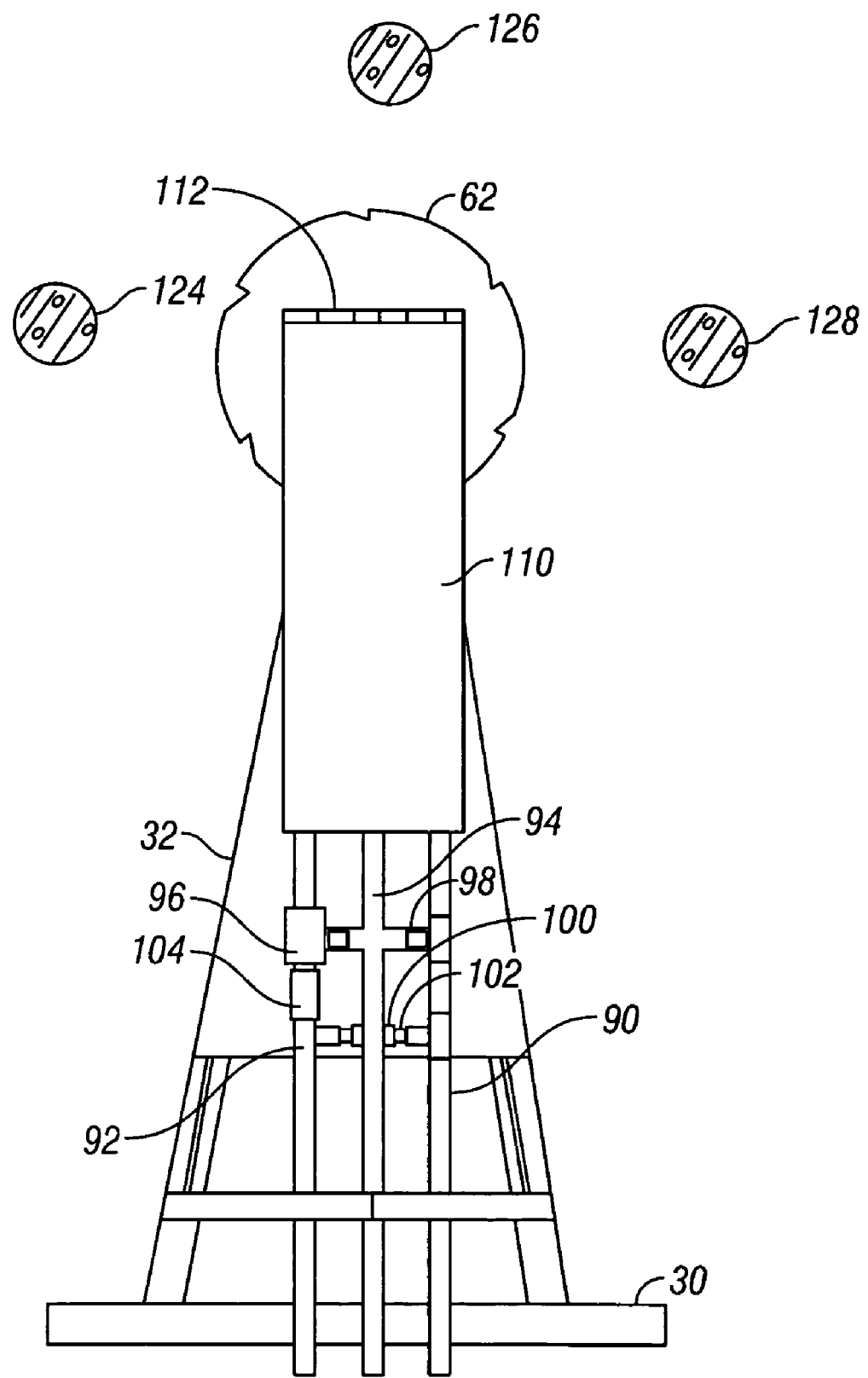
FIG. 6 is a plan view of the tree cutting attachment showing the hydraulic lines and illustrating the blade's ability to cut upstanding trees from the front and both sides.
Figure 7:
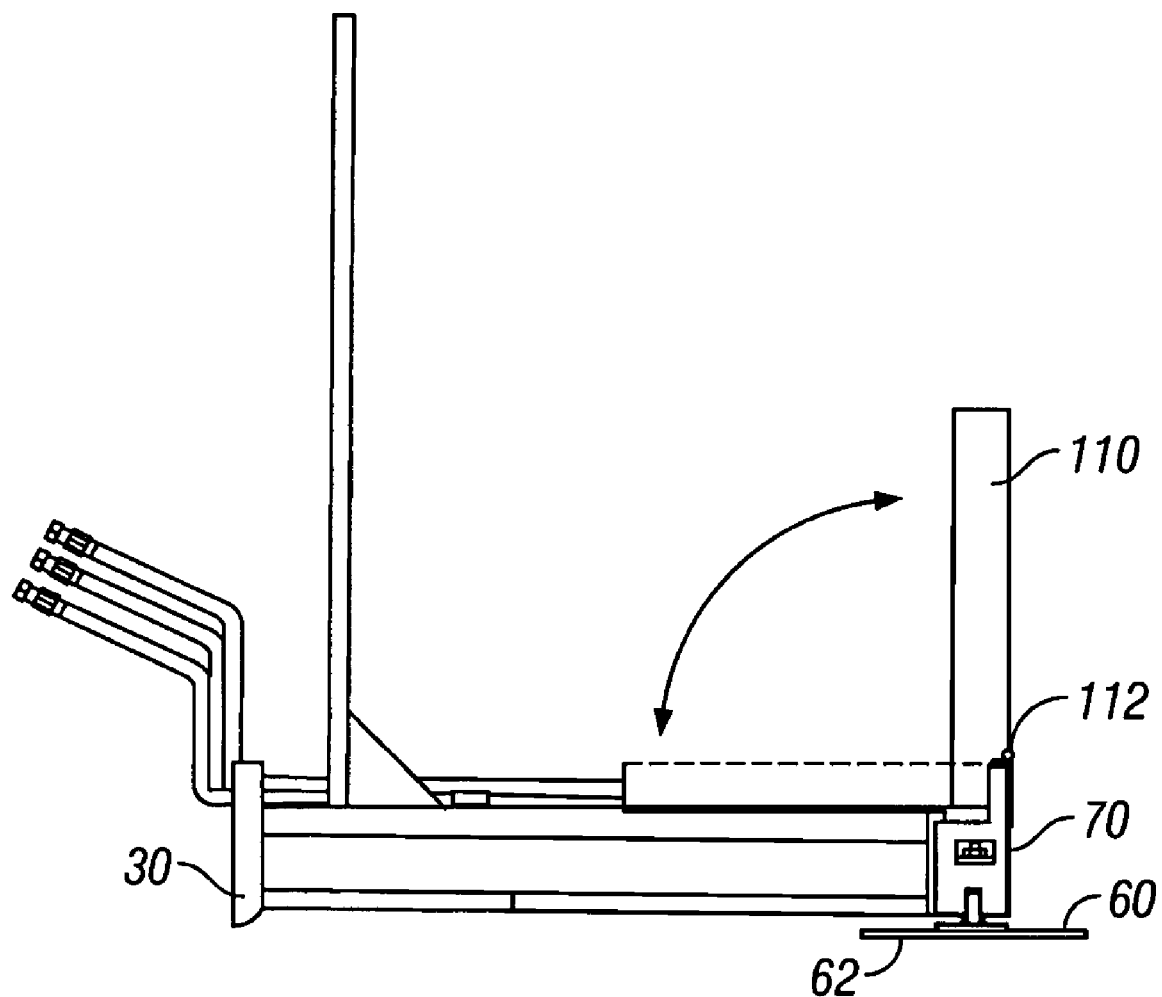
FIG. 7 is a side elevational view of the tree cutting attachment showing the pivotal opening of the hose cover or hood.

Alternately, as shown best in FIGS. 2 and 6, the hose cover is made of solid sheet metal and takes the form of a hood 110 sized to cover all three hoses. The hood 110 conveniently may extend toward the second end 44 of the arm 32 to cover the motor 72 as well. The end 108 of the hood 110 nearest the motor may be pivotally attached by a hinge 112 extending between the side panels 76 and 78. In this way, when access to the motor or the hoses is needed, the hood 110 is simply opened. Bolts (not shown) may be used to secure the hood 110 in the closed position during use of the attachment 14.

On most skid steer loaders, the operator's compartment 18 is enclosed at least by expanded metal panels, as shown in FIG. 1. However, it is desirable to include some additional protection on the tree cutting attachment 14 against damage to the loader and injury to the operator. For this purpose, a brush guard preferably is provided on the attachment 14.

The brush guard may take many shapes and may be formed of several different materials. In the preferred form, the brush guard 120 is a vertically extending panel formed of expanded metal. Since the expanded metal is visually transparent, the brush guard can be made at least about equal in height to the head of an operator seated in the operator's compartment. More preferably, as best seen in FIG. 1, the brush guard extends to at least the top of the operator's compartment 18 on the loader 12.

Now it will be seen that the present invention offers an agile and versatile tree cutter. Indicated at 124, 126 and 128 in FIG. 6 are three trees shown in cross section. As shown, the saw blade 62 is nonmovably supported at the second or free end 44 of the non-jointed arm 32. Thus, except for raising and lowering the attachment 14, all the positioning of the attachment is done by moving the loader 12. Using the steering and power controls in the operator compartment 18, the operator can move forward and backward, and to the left and right.

In the preferred design, at least the toothed edge 64 of the blade 62 is exposed on all three sides. Even more desirably, the blade is uncovered a distance radially toward the center by several inches. This arrangement makes it possible for the horizontally aligned blade to cut several inches into the trunks of vertically extending or upstanding trees from all three directions. This provides a cutting device that can easily cut through trees with trunks up to several inches in diameter.

Still further, placement of the cutting assembly 60 at the end of the elongate arm 32 enables the operator to extend the cutting assembly deep into low and laterally extending branches so characteristic of cedar trees. Moreover, this allows the machine to be used in a dense thicket of trees with many tree trunks in close proximity; there is no need for operating space between the trees Changes can be made in the combination and arrangement of the various parts and steps described herein without departing from the spirit and scope of the invention.

What is claimed is:

1. A tree cutting attachment for a skid steer loader, the attachment comprising:
   a universal mounting plate removably attachable to the skid loader;
   a non-jointed arm having a first end non-movably attached to the mounting plate and a second end, the arm extending forwardly of the mounting plate;
   a cutting assembly nonmovably attached to the second end of the arm and comprising a saw blade mounted for rotation on a vertical axis; and
   a drive assembly for driving rotation of the saw blade.

2. The tree cutting attachment of claim 1 wherein the drive assembly comprises a direct drive motor housed on the second end of the arm.

3. The tree cutting attachment of claim 2 wherein the drive assembly further comprises an overhung load adapter.

4. The tree cutting attachment of claim 2 wherein the motor is hydraulically driven.

5. The tree cutting attachment of claim 4 wherein the drive assembly further comprises an overhung load adapter.

6. The tree cutting attachment of claim 1 wherein the drive assembly comprises hydraulic hoses extending the length of the arm and wherein the assembly further comprises a cover for protecting the hydraulic hoses.

7. The tree cutting attachment of claim 6 wherein the hose cover is openable.

8. The tree cutting attachment of claim 7 wherein the hose cover is hingedly attached to the second end of the arm.

9. The tree cutting attachment of claim 6 wherein the hose cover is solid.

10. The tree cutting attachment of claim 1 wherein the blade is circular.

11. The tree cutting attachment of claim 10 wherein the blade has a toothed edge.

12. The tree cutting attachment of claim 1 further comprising a brush guard.

13. The tree cutting attachment of claim 12 wherein the brush guard comprises expanded metal.

14. The tree cutting attachment of claim 13 wherein the skid steer loader comprises a seat for the operator and wherein the brush guard extends vertically to a height at least about equal to the head of an operator seated in the seat of the skid steer loader when the attachment is attached thereto.

15. The tree cutting attachment of claim 12 wherein the skid steer loader comprises a seat for the operator and wherein the brush guard extends vertically to a height at least about equal to the head of an operator seated in the seat of the skid steer loader when the attachment is attached thereto.

16. The tree cutting attachment of claim 1 wherein the saw blade is adapted to cut upstanding trees on at least three sides.

17. A tree cutting assembly comprising:
    a skid steer loader;
    a tree cutting attachment comprising:
      a universal mounting plate removably attachable to the skid loader;
      a non-jointed arm having a first end non-movably attached to the mounting plate and a second end, the arm extending forwardly of the mounting plate;
      a cutting assembly nonmovably attached to the second end of the arm and comprising a saw blade mounted for rotation on a vertical axis; and
      a drive assembly for driving rotation of the saw blade.

18. The tree cutting assembly of claim 17 wherein the drive assembly comprises a direct drive motor housed on the second end of the arm.

19. The tree cutting assembly of claim 18 wherein the drive assembly further comprises an overhung load adapter.

20. The tree cutting assembly of claim 18 wherein the motor is hydraulically driven.

21. The tree cutting assembly of claim 20 wherein the drive assembly further comprises an overhung load adapter.

22. The tree cutting assembly of claim 17 wherein the drive assembly comprises hydraulic hoses extending the length of the arm and wherein the assembly further comprises a cover for protecting the hydraulic hoses.

23. The tree cutting assembly of claim 22 wherein the hose cover is openable.

24. The tree cutting assembly of claim 23 wherein the hose cover is hingedly attached to the second end of the arm.

25. The tree cutting assembly of claim 24 wherein the hose cover is solid.

26. The tree cutting assembly of claim 17 wherein the blade is circular.

27. The tree cutting assembly of claim 26 wherein the blade has a toothed edge.

28. The tree cutting assembly of claim 17 further comprising a brush guard.

29. The tree cutting assembly of claim 28 wherein the brush guard comprises expanded metal.

30. The tree cutting assembly of claim 29 wherein the skid steer loader comprises a seat for the operator and wherein the brush guard extends vertically to a height at least about equal to the head of an operator seated in the seat of the skid steer loader when the attachment is attached thereto.

31. The tree cutting assembly of claim 28 wherein the skid steer loader comprises a seat for the operator and wherein the brush guard extends vertically to a height at least about equal to the head of an operator seated in the seat of the skid steer loader when the attachment is attached thereto.

32. The tree cutting assembly of claim 17 wherein the saw blade is circular and its edge is adapted to cut upstanding trees on at least three sides.

* * * * *

(12) EX PARTE REEXAMINATION CERTIFICATE (9001st)

United States Patent
Williams

(10) Number: US 7,152,640 C1
(45) Certificate Issued: May 8, 2012

(54) TREE CUTTING ATTACHMENT FOR A SKID STEERLOADER

(75) Inventor: Larry L. Williams, Weatherford, OK (US)

(73) Assignee: Larry L. Williams, Weatherford, OK (US)

Reexamination Request:
No. 90/009,896, Jul. 25, 2011

Reexamination Certificate for:
Patent No.: 7,152,640
Issued: Dec. 26, 2006
Appl. No.: 10/896,686
Filed: Jul. 22, 2004

Related U.S. Application Data

(60) Provisional application No. 60/511,513, filed on Oct. 15, 2003.

(51) Int. Cl.
*A01G 23/08* (2006.01)

(52) U.S. Cl. ........................ 144/4.1; 144/34.1
(58) Field of Classification Search ........................ None
See application file for complete search history.

(56) References Cited

To view the complete listing of prior art documents cited during the proceeding for Reexamination Control Number 90/009,896, please refer to the USPTO's public Patent Application Information Retrieval (PAIR) system under the Display References tab.

*Primary Examiner* — Joseph A. Kaufman

(57) ABSTRACT

A tree cutting attachment for a skid steer loader. The attachment comprises a universal mounting plate by which the attachment quickly and simply is removably attachable to the loader. A circular saw blade is supported at the end of a non jointed arm that extends forwardly from the mounting plate. A hydraulically driven, direct drive motor is supported on the forward end of the arm above the blade and an overhung load adapter may be interposed between the motor and the blade. The blade is mounted for rotation on a vertical axis and preferably is a circular blade with a toothed edge. Leaving the cutting edge of the blade exposed about its entire periphery allows the blade to approach and cut upstanding trees from three sides. A brush guard, preferably of expanded metal, extends upwardly from the arm high enough to protect the operator of the loader.

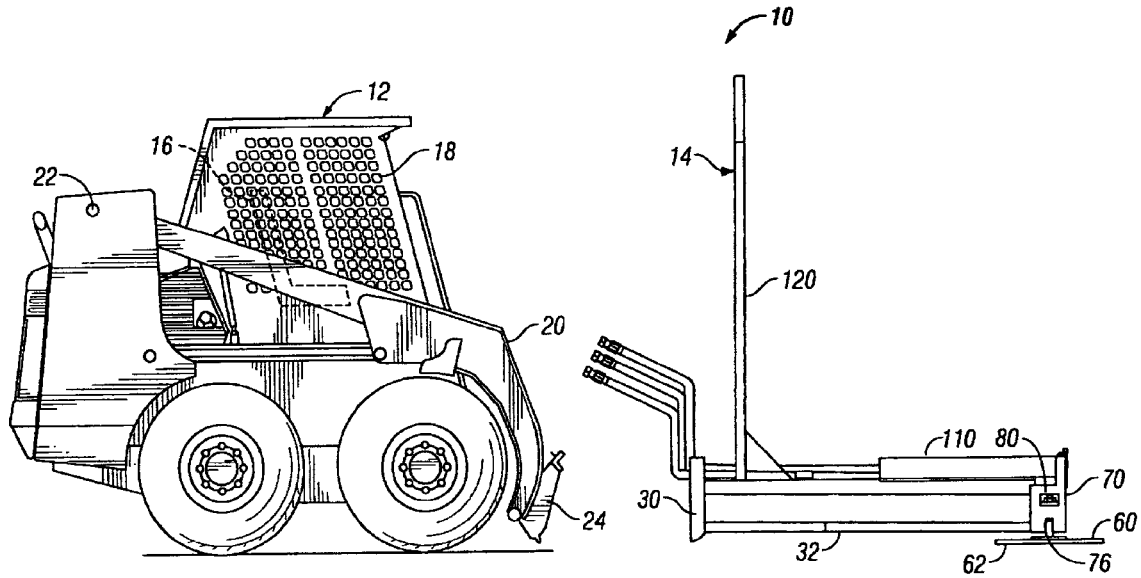

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 5, 18, 19 and 21 are cancelled.

Claims 1, 4, 6, 17, 20 and 22 are determined to be patentable as amended.

Claims 7-16 and 23-32, dependent on an amended claim, are determined to be patentable.

New claims 33-42 are added and determined to be patentable.

1. A tree cutting attachment for a skid steer loader, the attachment comprising:
   a universal mounting plate removably attachable to the skid loader;
   a non-jointed arm having a first end non-movably attached to the mounting plate and a second end, the arm extending forwardly of the mounting plate;
   a cutting assembly nonmovably attached to the second end of the arm and comprising a saw blade mounted for rotation on a vertical axis; and
   a drive assembly for driving rotation of the saw blade, *wherein the drive assembly comprises, a direct drive motor housed on the second end of the arm, and an overhung load adapter.*

4. The tree cutting attachment of claim [2] *1* wherein the motor is hydraulically driven.

6. [The tree cutting attachment of claim 1] *A tree cutting attachment for a skid steer loader, the attachment comprising:*
   *a universal mounting plate removably attachable to the skid loader;*
   *a non-jointed arm having a first end non-movably attached to the mounting plate and a second end, the arm extending forwardly of the mounting plate;*
   *a cutting assembly nonmovably attached to the second end of the arm and comprising a saw blade mounted for rotation on a vertical axis; and*
   *a drive assembly for driving rotation of the saw blade,* wherein the drive assembly comprises hydraulic hoses extending the length of the arm, and [wherein the assembly further comprises] a cover for protecting the hydraulic hoses.

17. A tree cutting assembly comprising:
    a skid steer loader;
    a tree cutting attachment comprising:
       a universal mounting plate removably attachable to the skid loader;
       a non-jointed arm having a first end non-movably attached to the mounting plate and a second end, the arm extending forwardly of the mounting plate;
       a cutting assembly nonmovably attached to the second end of the arm and comprising a saw blade mounted for rotation on a vertical axis; and
       a drive assembly for driving rotation of the saw blade, *wherein the drive assembly comprises, a direct drive motor housed on the second end of the arm, and an overhung load adapter.*

20. The tree cutting assembly of claim [18] *17* wherein the motor is hydraulically driven.

22. [The tree cutting assembly of claim 17] *A tree cutting assembly comprising:*
    *a skid steer loader;*
    *a tree cutting attachment comprising:*
       *a universal mounting plate removably attachable to the skid loader;*
       *a non-jointed arm having a first end non-movably attached to the mounting plate and a second end, the arm extending forwardly of the mounting plate;*
       *a cutting assembly nonmovably attached to the second end of the arm and comprising a saw blade mounted for rotation on a vertical axis; and*
       *a drive assembly for driving rotation of the saw blade,* wherein the drive assembly comprises hydraulic hoses extending the length of the arm[and wherein the assembly further comprises], a cover for protecting the hydraulic hoses.

*33. A tree cutting attachment for a skid steer loader, the attachment comprising:*
   *a universal mounting plate removably attachable to the skid loader;*
   *a non-jointed arm having a first end non-movably attached to the mounting plate and a second end, the arm extending forwardly of the mounting plate;*
   *a cutting assembly nonmovably attached to the second end of the arm and comprising a saw blade mounted for rotation on a vertical axis; and*
   *a drive assembly for driving rotation of the saw blade, wherein the drive assembly comprises;*
       *a direct drive motor housed on the second end of the arm;*
       *an overhung load adapter; and*
       *hydraulic hoses extending the length of the arm, and further wherein the drive assembly further comprises a cover for protecting the hydraulic hoses.*

*34. The tree cutting attachment of claim 33 wherein the motor is hydraulically driven.*

*35. The tree cutting attachment of claim 33 further comprising a brush guard.*

*36. The tree cutting attachment of claim 35 wherein the brush guard comprises expanded metal.*

*37. A tree cutting assembly comprising:*
    *a skid steer loader;*
    *a tree cutting attachment comprising:*
       *a universal mounting plate removably attachable to the skid loader;*
       *a non-jointed arm having a first end non-movably attached to the mounting plate and a second end, the arm extending forwardly of the mounting plate;*
       *a cutting assembly nonmovably attached to the second end of the arm and comprising a saw blade mounted for rotation on a vertical axis; and*
       *a drive assembly for driving rotation of the saw blade, wherein the drive assembly comprises;*
          *a direct drive motor housed on the second end of the arm;*
          *an overhung load adapter; and* hydraulic hoses extending the length of the arm and further wherein the drive assembly further comprises at least a cover for protecting the hydraulic hoses.

38. The tree cutting attachment of claim 41 wherein the hose cover is openable.

39. The tree cutting attachment of claim 39 wherein the hose cover is hingedly attached to the second end of the arm.

40. The tree cutting attachment of claim 38 wherein the hose cover is solid.

41. The tree cutting attachment of claim 38 further comprising a brush guard.

42. The tree cutting attachment of claim 41 wherein the brush guard comprises expanded metal.

* * * * *